Jan. 15, 1957   G. D. HUNTER   2,777,378
SPRING CUSHIONED CLAMP
Filed Feb. 4, 1954

INVENTOR.
GEORGE D. HUNTER
ATTORNEYS

United States Patent Office 2,777,378
Patented Jan. 15, 1957

2,777,378

SPRING CUSHIONED CLAMP

George D. Hunter, Des Moines, Iowa, assignor to Deere Manufacturing Co., Dubuque, Iowa, a corporation of Iowa Application February 4, 1954, Serial No. 408,075

5 Claims. (Cl. 97—47.84)

The present invention relates generally to agricultural implements, and more particularly to ground-working implements of the type including a mobile frame and one or more ground-working tools connected therewith.

The object and general nature of the present invention is the provision of a new and improved connecting mechanism for swingably connecting a non-working tool with its tool-supporting means. More specifically, it is a feature of this invention to provide new and improved means for not only connecting the tool to its supporting means but also properly locating the tool in its operating position whereby, in the case of the implement including a plurality of ground-working tools, all of the tools will be located in substantially identical positions relative to the tool-supporting means. A further feature of this invention is to provide adjustability in the tool-aligning means whereby, when necessary, minor changes may be made in the position of the tools so that the tools may be properly aligned notwithstanding certain manufacturing variations in one or more of the attaching parts.

These and other objects and advantages of the present invention will be apparent to those skilled in the art after a consideration of the following detailed description, taken in conjunction with the accompanying drawings, in which.

Figure 1:
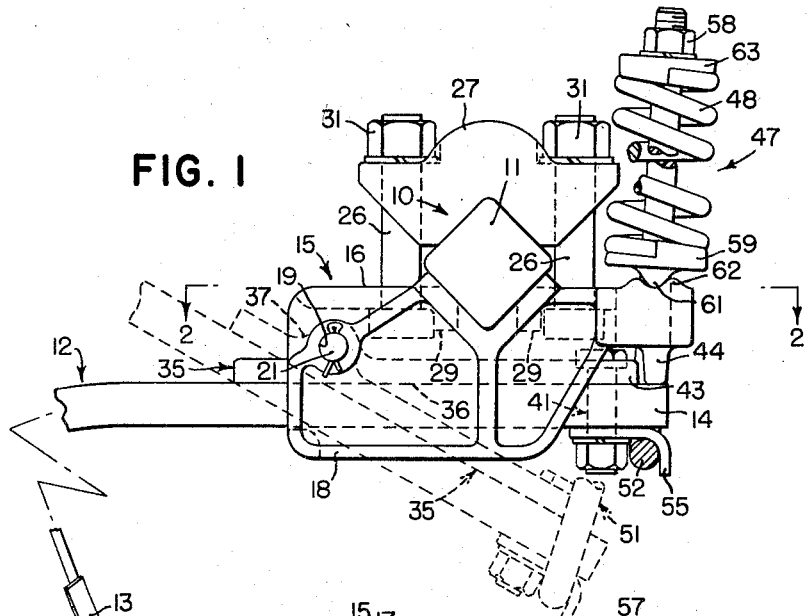
Fig. 1 is a side view of a tool-mounting structure in which the principles of the present invention have been incorporated.

Referring first to Fig. 1, Fig. 1 shows the present invention as incorporated in an agricultural implement of the type that comprises a mobile frame 10 including a transverse tool bar 11, generally of square cross section and forming supporting means for one or more, generally a plurality, of soil-working tools, such as a spring cultivator tooth 12. The tool 12 is formed with a soil-working portion 13 and a generally fore-and-aft extending attaching standard section 14. The present invention is primarily concerned with new and improved attaching means for connecting the tools 12 with the tool bar 11.

Figure 2:
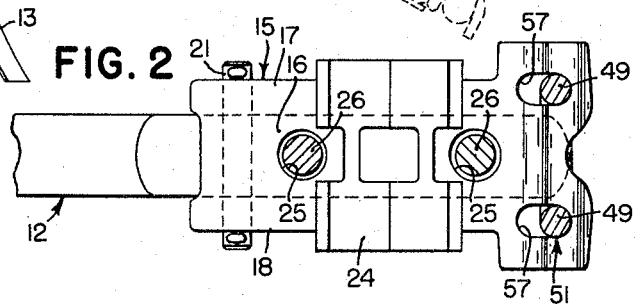
Fig. 2 is a sectional view taken generally along the line 2—2 of Fig. 1.

The attaching or connecting means of the present invention comprises a lower bracket 15 that includes an upper wall portion 16 and two side wall portions or sections 17 and 18, the member 15 being elongated and disposed transversely relative to the tool bar 11, and the side wall sections 17 and 18 being apertured, as at 19, adjacent one end of the bracket 15 to form means receiving respective opposite ends of a pivot pin 21. Midway of its length, the bracket member 15 is formed on the upper side thereof with a generally V-shaped socket section 24 shaped to receive the lower part of the transverse tool bar 11, as best shown in Figs. 1 and 2. The horizontal wall section 16 of the bracket 15 is apertured, as at 25, to receive a pair of clamping bolts 26 that extend upwardly and receive a clamping cap member 27 shaped to engage the upper side of the tool bar 11. When the bolts 26 are tightened, the cap 27 is securely clamped against the upper side of the tool bar 11 while the bracket 15 is securely clamped to the lower side thereof. Lugs 29 (Fig. 1) on the upper wall section 16 of the bracket 15 are shaped and disposed so as to engage the heads of the bolts 26 so as to keep them from turning when the nuts 31 on the bolts are tightened or loosened.

A lower portion of the bracket 15, in the form of a hinge member 35 having a flat lower face 36, is disposed between the wall sections 17 and 18 and provided with an apertured transverse boss section 37 receiving the pivot pin 21, whereby the member 35 is pivotally connected for swinging movement relative to the bracket 15. The boss section 37 receiving the hinge pin 21 is disposed adjacent one end of the hinge member 35, while the other end of the hinge member is apertured to receive a short bolt 41 that serves to fixedly secure the attaching standard section 14 to the hinge member 35. As a result of this arrangement, the tool 12 and the hinge member 35 swing as one about a transverse axis relative to the associated clamping bracket 15 and the tool bar 11.

The end of the hinge member 35 opposite the hinge pin 21 terminates short of the associated end of the clamp bracket 15, as indicated by the reference character 43. The bracket 15 at this point is formed with a depending spacer or stop lug 44 that extends downwardly, clearing the end 43 of the hinge member and in a position to contact the upper face of the forward end of the attaching standard section 14.

Figure 3:
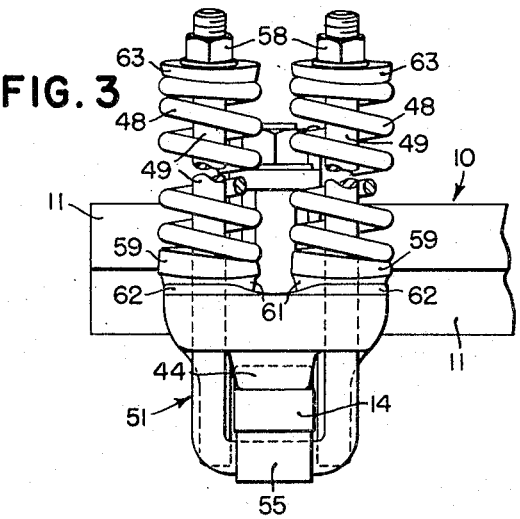
Fig. 3 is an end view of the construction shown in Fig. 1.

As mentioned above, the lower face 36 of the hinge member 35 is flat and is thereby adapted to receive the upper face of the tool standard 12. The tool member 12 is adapted to be yieldingly held up against the lower end of the lug 44 by spring means 47 that comprises a pair of coil springs 48 disposed about the leg sections 49 of a U-bolt member 51, the lower or bight portion 52 of which embraces the forward end 14 of the tool 12, the lower portion of the U-bolt 51 being held in place by a clip 55 fixed to the front end of the tool 12 by the attaching bolt 41, as best shown in Fig. 1. The leg sections 49 of the U-bolt 51 extend upwardly through openings 57, larger than the associated bolt sections, the upper ends of the leg sections 49 being threaded to receive nuts 58. The lower end of each of the springs 48 seats in an associated pivot cap 59, and each of the caps 59 is provided with a knife edge section 61 rockably disposed in a generally upwardly facing V-shaped notch 62 formed in the upper side of the bracket 15 adjacent the end thereof opposite the hinge pin 21. The upper end of each of the springs 48 is received in an upper spring cap 63, as best shown in Figs. 1 and 3.

In operation, the nuts 58 are tightened to a point to introduce the desired amount of compression in the springs 48, the force of the springs acting through the U-bolt 51 to hold the upper face of the forward end 14 of the tool 12 against the stop or spacer lug 44. As will be seen best from Fig. 1, there is no contact between the upper surface of the hinge member 35 and any part of the upper portion 16 of the bracket 15, and there exists a normal spaced apart relationship between the upper portion 16 and the lower portion or hinge member 35 as determined by the length of the lug or spacer 44. The members 15 and 35 preferably are castings, and in forming the bracket member 15, the lug 44 and the openings 19 for receiving the hinge pin 21 are cast in a dry sand core, which results in positively locatings the bottom or lower end face of the lug 44 with respect to the axis of the hinge-pin-receiving openings 19. The opening in the boss 37 of the hinge member 35 will be gauged from the bottom surface, or the tool-receiving surface, indicated at 36, of the hinge member 35. Thus, the position of the tool 12 relative to the bracket 15 will be independent of the thickness of the hinge member 35. Therefore, manufacturing variations in the member 35, which may be appreciable where the member 35 is a casting, will have no effect on the normal position of the tool 12, and therefore where a plurality of tools 12 are employed, they will all occupy substantially the same positions with respect to the supporting tool bar 11.

Figure 4:
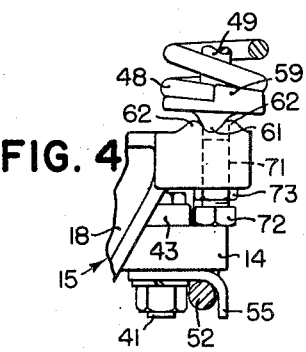
Fig. 4 is a fragmentary view, similar to Fig. 1, showing a modified form of stop means.

In cases where it is desired to provide for some adjustment in the position of individual tools 12 relative to the bar 11, the construction shown in Fig. 4 may be adopted. Referring now to this figure, it will be seen that the end of the bracket 15 opposite the hinge pin 21 may be formed with a threaded or tapped opening 71 in which a stud bolt 72 is threaded. Preferably, the bolt extends entirely through the opening 71 and at its head end receives a lock nut 73. The head or lower end of the bolt 72 is disposed to clear the adjacent end 43 of the hinge member 35 and to contact directly the upper face of the tool standard section 14 in substantially the same manner as the integral lug 44 shown in Fig. 1.

While I have shown and described above the preferred structure in which the principles of the present invention have been incorporated, it is to be understood that my invention is not to be limited to the exact means shown and described above, but that, in fact, widely different means may be employed in the broader aspects of my invention.

What I claim, therefore, and desire to secure by Letters Patent is:

1. In a ground-working implement including a tool-supporting means and a ground-working tool including an attaching section adapted to be swingably connected with said tool-supporting means, the improvement comprising tool-connecting means comprising a bracket having an upper portion shaped to receive said tool-supporting means, said bracket comprising an elongated member having an apertured portion at one end thereof, clamp means connected with said bracket for fixing the latter to said tool-supporting means, an elongated hinge member pivotally connected at one end with the apertured portion of said bracket and extending toward but terminating short of the other end of said bracket, means connecting a tool to said hinge member so that the tool is mounted under and extends beyond the other end of said hinge member, spacer means carried by said bracket at said other end thereof in a position to clear said hinge member and engage the upper face of the portion of said tool that extends outwardly from said other end of said hinge member for preventing contact of said upper portion of the bracket and the hinge member, and spring means connected to act against said bracket and said tool and hinge member for yieldably holding the upper face of said tool against said spacer means.

2. The invention set forth in claim 1, further characterized by said other end of said bracket having a pair of laterally spaced apart, generally vertically extending apertures therein, the axes of which extend generally vertically at opposite sides of said tool and hinge member, a U-shaped bolt disposed in said apertures with the bight portion of said bolt underlying the portion of said tool extending beyond said hinge member, and a pair of springs disposed about the leg portions of said U-bolt and acting between said bracket and against said tool through said U-bolt.

3. The invention set forth in claim 2, further characterized by said tool being attached to said hinge member by bolt means, and an attaching clip fixed to said tool and hinge member by said last-mentioned bolt and including a portion to receive the bight portion of said U-bolt.

4. The invention set forth in claim 1, further characterized by said spacer means comprising a lug fixed to said bracket at said other end thereof and extending downwardly from the lower portion of said bracket in a position to contact the upper face of said standard section.

5. The invention set forth in claim 1, further characterized by said spacer means comprising a screw-threaded opening extending generally vertically into said bracket at said other end thereof, a stud bolt threaded into said screw-threaded opening and extending downwardly from the bracket into a position engaging the upper face of said tool standard section, and means locking said threaded member in different positions of adjustment.

References Cited in the file of this patent

UNITED STATES PATENTS

| | | |
|---|---|---|
| 2,259,890 | Hipple | Oct. 21, 1941 |
| 2,627,798 | Graham | Feb. 10, 1953 |
| 2,674,172 | Graham | Apr. 6, 1954 |
| 2,712,781 | Rolf | July 12, 1955 |

FOREIGN PATENTS

| | | |
|---|---|---|
| 175,736 | Great Britain | Feb. 20, 1922 |
| 197,989 | Great Britain | May 11, 1923 |
| 18,947 of 1929 | Australia | Mar. 25, 1930 |